United States Patent [19]

Okada

[11] Patent Number: 5,030,830
[45] Date of Patent: Jul. 9, 1991

[54] HOUSING OF RADIATION DETECTOR
[75] Inventor: Hiroyuki Okada, Shizuoka, Japan
[73] Assignee: Hamamatsu Photonics K.K., Shizuoka, Japan
[21] Appl. No.: 475,509
[22] Filed: Feb. 6, 1990
[30] Foreign Application Priority Data
  Feb. 7, 1989 [JP] Japan .................................. 1-28227
[51] Int. Cl.$^5$ .............................................. G01T 1/20
[52] U.S. Cl. ............................. 250/361 R; 250/363.03; 250/366
[58] Field of Search ................... 250/363.03, 367, 366, 250/361 R, 363.02

[56] References Cited
U.S. PATENT DOCUMENTS
  4,158,773  6/1979  Novak .................................. 250/368
  4,323,778  4/1982  Wykes et al. ........................ 250/367

FOREIGN PATENT DOCUMENTS
  WO85/00665  2/1985  World Int. Prop. O.

OTHER PUBLICATIONS
Tanaka et al., "Engineering Aspects of a Hybrid Emission Computed Tomograph", IEEE Trans. Nuc. Sci. 28 (1), Feb. 1981, pp. 137–141.

Primary Examiner—Carolyn E. Fields
Attorney, Agent, or Firm—Finnegan, Henderson, Farabow, Garrett and Dunner

[57] ABSTRACT

A housing of a radiation detector is disclosed which comprises a radiation detecting cassette having a light-shielding cassette case with accommodating grooves delineated by partitions integral with the cassette case, a radiation detector accommodated in each of the grooves and which is composed of a scintillator and photomultiplier tube, and a cover that closes the cassette case. A flowable and light-shielding filler material is injected into the space between each of the grooves and the radiation detector and cured after closing the cassette case with the cover.

9 Claims, 3 Drawing Sheets

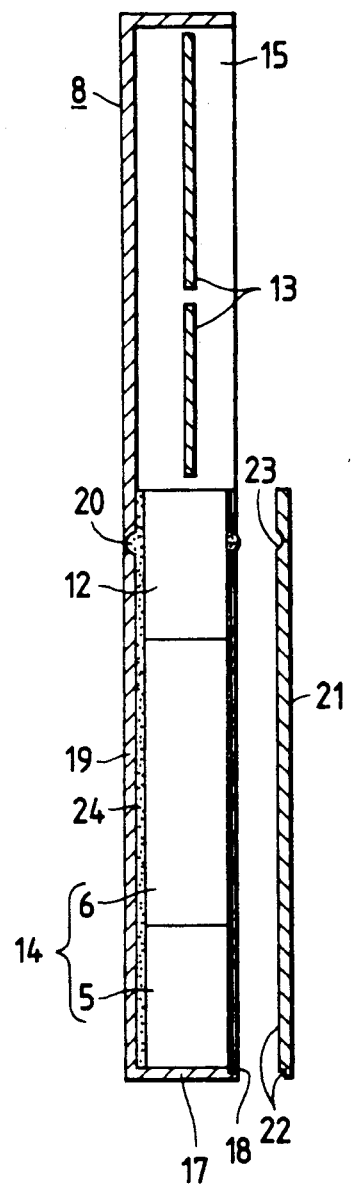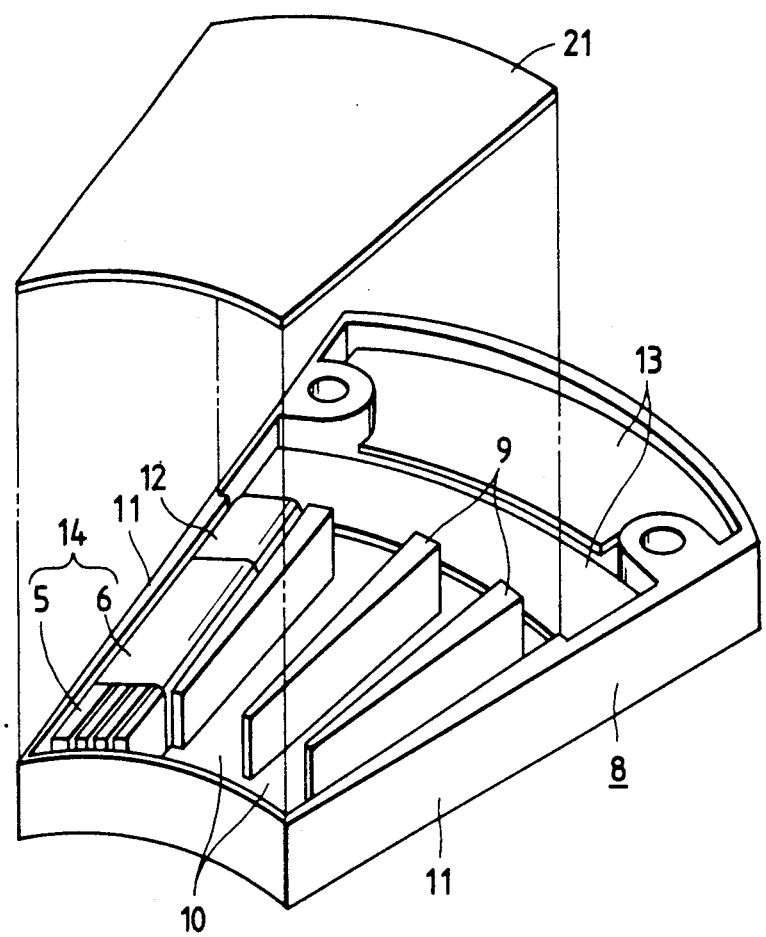

HOUSING OF RADIATION DETECTOR

BACKGROUND OF THE INVENTION

The present invention relates to a housing which enables radiation detectors to be accommodated within cassette cases in a reliable manner when they are used in a positron computed tomographic (CT) apparatus or a single-photon emission CT apparatus.

FIG. 5 is a schematic representation of a recently proposed positron CT apparatus capable of high resolution. As shown, this apparatus comprises basically a ring-shaped gantry 1 and a holder 3 such as a bed which holds the subject 2 in position.

The gantry 1 comprises a plurality of generally fan-shaped cassettes 4 for detecting gamma-rays that are arranged in annular form. Each of these cassettes accommodates four rows of a radiation detector 14 consisting of a scintillator 5 and a photomultiplier tube 6. These cassettes are juxtaposed in five stacks and a shield collimator 7 is provided on both the inside and the outside of the five stacks of cassettes 4.

Further, a slice collimator (not shown) is provided as required between adjacent stacks of scintillator 5 to reduce the entrance of background noise (i.e., scattering radiation and single gamma-rays).

Each of the radiation detecting cassettes 4 is accommodated in a cassette case 8 as shown in FIG. 4. This cassette case 8 is made of a material such as aluminum or a plastic resin that is transmissive of radiation (gamma-rays) but which is opaque to light. The cassette case 8 is provided with spaced partitions 9 that are formed as integral parts of this case. A radiation detector 14 consisting of a scintillator 5 and a photomultiplier tube 6 and which is fixed by a bleeder socket 12 is accommodated in each of grooves 10 which are delineated by side walls 11 and adjacent partitions 9. A circuit board 13 containing a bleeder circuit and any other necessary circuits is provided in the cassette case 8 along its outer circumference.

The photomultiplier tube 6 in each radiation detector 14 is usually encased within a glass tube having variations in its outside dimensions. Hence, each of the grooves 10 in the cassette case 8 is made considerably larger than the dimensions of the glass tube. However, this creates an unavoidable gap between the glass tube and each accommodating groove 10 and on account of nonuniformity in the size of this gap, the photomultiplier tube 6 and scintillator 5 of which each radiation detector 14 is composed will rattle or move about to make it impossible to perform precise measurements. Further, the rattling photomultiplier tube or scintillator can damage themselves. In order to avoid this problem, one may measure the nonuniform gap and insert a spacer of commensurate size. However, because of the thermal expansion mismatch between the aluminum cassette case 8 and the glass tube the radiation detector 14 might be damaged resulting from a temperature elevation that occurs after the spacer is fitted into the gap. Further, the gap must be covered with an aluminum foil or some other light-shielding material in order to avoid the noise problem due to entrance of ambient light.

SUMMARY OF THE INVENTION

An object, therefore, of the present invention is to provide a housing that allows radiation detectors to be accommodated within grooves in a cassette in a safe and reliable manner and that insures effective light shielding.

The housing of the present invention is generally of a type that comprises a radiation detecting cassette which comprises a light-shielding case having accommodating grooves delineated by partitions integral with said cassette case, a radiation detector accommodated in each of said grooves and which consists essentially of a scintillator and a photomultiplier tube, and a cover that closes said cassette case. The present invention attains the above-stated object by injecting a flowable and light-shielding filler material into the space between each of said grooves and the radiation detector and curing the injected filler material after closing the cassette case with said cover.

BRIEF DESCRIPTION OF THE DRAWINGS

In the accompanying drawings:

FIG. 3 is a cross section taken on line III—III of FIG. 1;

FIG. 4 is a perspective view of a cassette case to which the invention is applied.

DESCRIPTION OF THE PREFERRED EMBODIMENT

Figure 1:
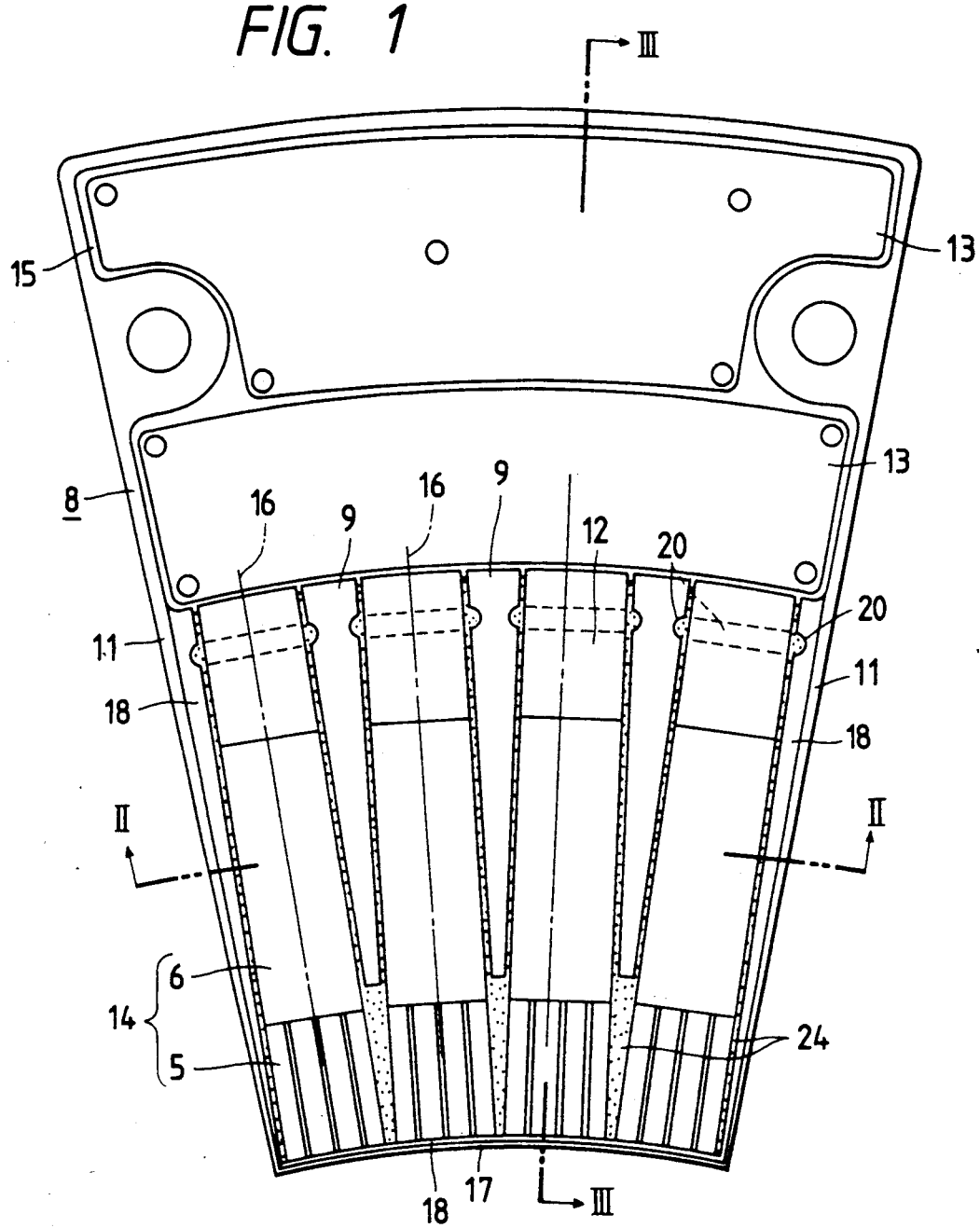
FIG. 1 is a front view of a radiation detector housing according to an embodiment of the present invention.
Figure 2:
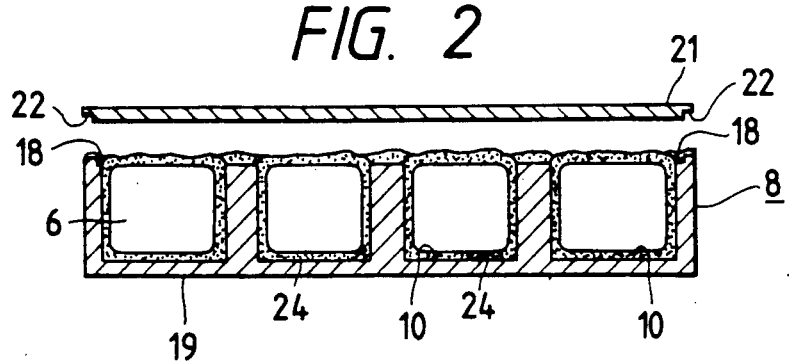
FIG. 2 is a cross section taken on line II—II of FIG. 1.
Figure 5:
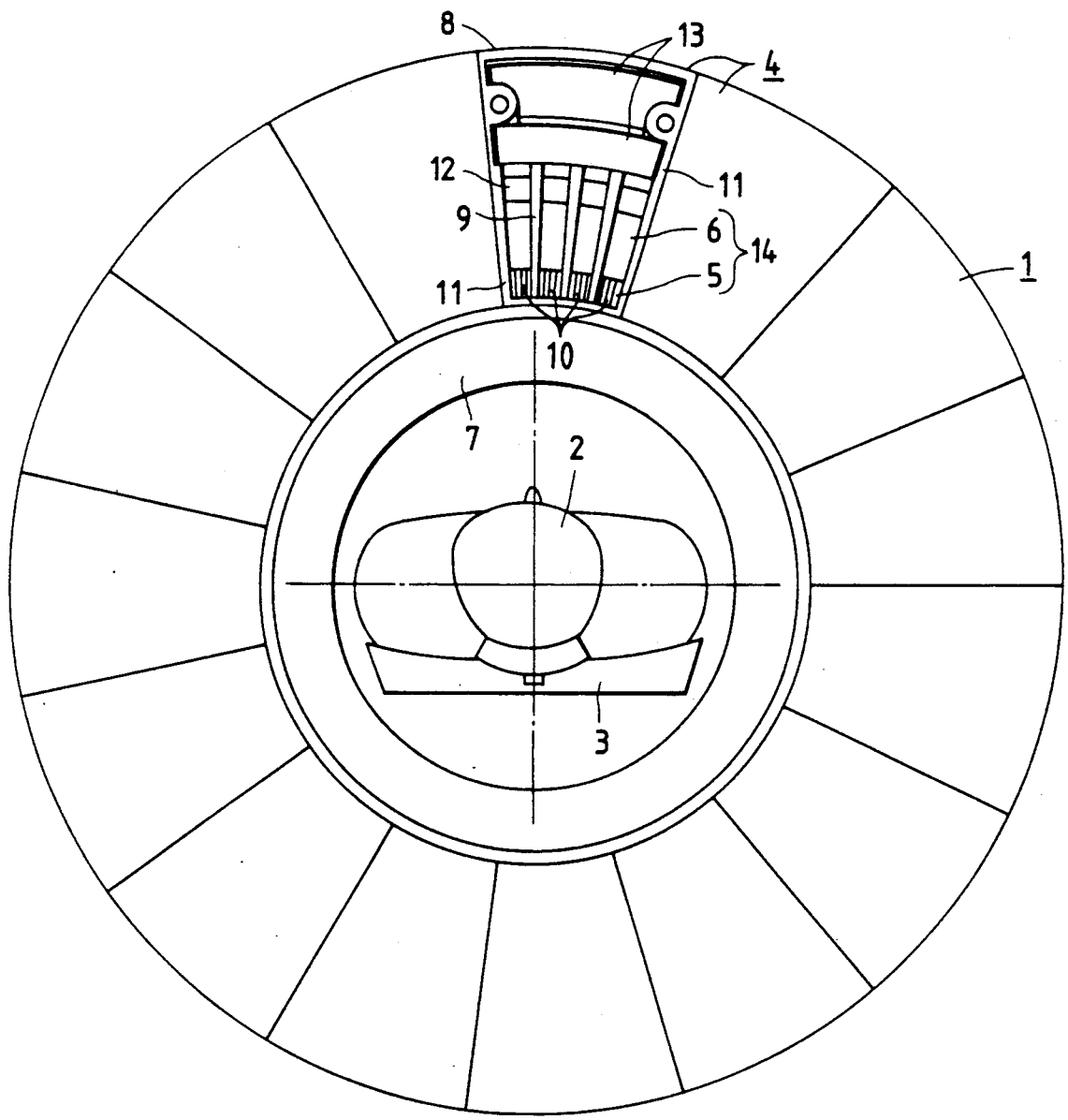
FIG. 5 is a front view of a gantry in a position CT apparatus.

An embodiment of the present invention is described hereinafter with reference to FIGS. 1-3. Shown by 8 is a cassette case which is made of aluminum or a plastic resin that is transmissive of gamma-rays but which is opaque to light. This cassette case is generally fan-shaped and a specified number, say, fifteen, of these cassette cases are arranged in annular form. Each cassette case is open on the top and has four grooves 10 for accommodating a corresponding number of radiation detectors 14 that are formed inwardly of an area 15 for accommodating a circuit board 13 for a bleeder circuit and some other necessary circuits. The grooves 10 are delineated by side walls 11 and adjacent partitions 9.

The side walls 11 and partitions 9 are in the form of a triangle that is tapered toward the center of the gantry in a direction parallel to the center line 16. A light-shielding step 18 is formed on the top surface of each side wall 11 and the front wall 17.

Semicircular light-shielding grooves 20 are formed on the bottom plate 19, side walls 11 and partitions 9 of the cassette case 8 along its entire circumference in areas close to the base end of each groove 10 and where a bleeder socket 12 is inserted.

The radiation detectors 14 accommodated in the cassette case 8 are then covered with a cover 21. A step 22 that engages the step 18 on the cassette case 8 is formed on three sides of the bottom surface of the cover 21, and light-shielding grooves 23 are also formed in registry with the grooves 20.

Four units of radiation detector 14 are fitted into the respective four grooves 10 in the cassette case 8 having the construction described above. A filler material 24 such as rubber is injected into each groove 10 and cured after the cover 21 is secured by a suitable fastening means such as screws. In order to insure satisfactory light-shielding effects, a highly flowable filler material 24 is injected into the area of groove 10 where the scintillator 5 is accommodated, whereas a less flowable filler material 24 is injected into the areas where the photomultiplier tube 6 and the bleeder socke 12 are accommodated for the purpose of insuring their complete fixation. Particular care should be taken to inject the filler material 24 into light-shielding grooves in the area where bleeder socket 12 is positioned. The cover 21 on the cassette case 8 is secured by screws or some other suitable fastening means and subsequently, the injected filler material 24 is cured.

In the embodiment described above, four scintillators 5 are provided in such a way as to divide the photocathode of a single photomultiplier tube 6 into four parts. If desired, the photocathode need not be divided and a single scintillator may be combined with a single photomultiplier tube.

Having the construction described on the foregoing pages, the housing of the present invention eliminates rattling of radiation detectors in the cassette and thus effectively prevents them from being damaged during use. Further, the housing provides exact directionality to insure precise measurements. The filler material injected into the grooves where the detectors are accommodated insure effective light shielding. The areas of the grooves where the scintillators are accommodated are provided with improved light-shielding effects since every part of them is injected with a highly flowable filler material. On the other hand, the areas of the grooves where photomultiplier tubes and bleeder sockets are accommodated are injected with a less flowable filler material to improve the fixation of these components. Further, the steps provided in the area where the cassette case and the cover are joined and the light-shielding grooves that are provided along the entire circumference of the areas where bleeder sockets are to be fitted in and that are injected with a filler material insure further improved light shielding and fixation.

What is claimed is:

1. A radiation detecting apparatus comprising:
   a light-shielding cassette case;
   a pair of partitions in said cassette case;
   a groove in said cassette case, said groove being defined by said pair of partitions;
   a radiation detector including a scintillator and a photomultiplier tube, said radiation detector being positioned in said groove; and
   a light-shielding filler material disposed between said groove and said radiation detector, said filler material conforming to the shape of the radiation detector and the groove to maintain the radiation detector in position in said groove.

2. The apparatus of claim 1 further comprising a plurality of partitions, a plurality of grooves defined by corresponding pairs of said partitions, and a plurality of radiation detectors, each radiation detector being positioned in a corresponding one of said grooves.

3. The apparatus of claim 1 further comprising a cover for closing said cassette case.

4. The apparatus of claim 3 wherein the cassette case and the cover each have an engaging portion in the form of a step, the engaging portion of the cassette case engaging and mating with the engaging portion of the cover.

5. The apparatus of claim 1 further comprising a light-shielding groove formed along the entire periphery of an area of the groove where the photomultiplier tube is positioned, the filler material being disposed in said light-shielding groove.

6. The apparatus of claim 1 wherein the filler material si rubber.

7. A method of mounting a radiation detector, including a scintillator and a photomultiplier tube, in a radiation detecting apparatus, the method comprising the steps of:
   providing a light-shielding cassette case having a groove;
   positioning the radiation detector in said groove;
   injecting a flowable and light-shielding filler material between said groove and said radiation detector, said filler material conforming to the shape of the radiation detector and and groove; and
   curing said filler material to maintain the radiation detector in position in said groove.

8. The method of claim 7 wherein the light-shielding cassette case has a cover, the cover being attached to the cassette case prior to the step of curing the filler material.

9. The method of claim 7 wherein a highly flowable filler material is injected in an area of the groove were the scintillator is positioned and a less flowable filler material is injected in an area of the groove where the photomultiplier tube is positioned.

* * * * *

UNITED STATES PATENT AND TRADEMARK OFFICE
CERTIFICATE OF CORRECTION

PATENT NO. : 5,030,830

DATED : July 09, 1991

INVENTOR(S) : Hiroyuki Okada

It is certified that error appears in the above-identified patent and that said Letters Patent is hereby corrected as shown below:

Claim 6, column 4, line 24, change "si" to --is--.

Claim 7, column 4, line 35, change "and" (the second occurrence) to --the--.

Claim 9, column 4, line 43, change "were" to --where--.

Signed and Sealed this

Thirtieth Day of March, 1993

Attest:

STEPHEN G. KUNIN

Attesting Officer

Acting Commissioner of Patents and Trademarks